(12) United States Patent
Moulton et al.

(10) Patent No.: US 10,315,571 B2
(45) Date of Patent: Jun. 11, 2019

(54) MIRROR REPLACEMENT SYSTEM FOR A VEHICLE

(71) Applicants: Frederick Moulton, Columbia, SC (US); Werner Lang, Ergersheim (DE)

(72) Inventors: Frederick Moulton, Columbia, SC (US); Werner Lang, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 178 days.

(21) Appl. No.: 15/621,113

(22) Filed: Jun. 13, 2017

(65) Prior Publication Data

US 2017/0361771 A1 Dec. 21, 2017

(30) Foreign Application Priority Data

Jun. 20, 2016 (DE) .................. 10 2016 007 522

(51) Int. Cl.
*B60R 1/00* (2006.01)
*B60R 1/04* (2006.01)
*B60R 1/06* (2006.01)
*H04N 7/18* (2006.01)
*G08G 1/0967* (2006.01)
*G08G 1/16* (2006.01)

(52) U.S. Cl.
CPC .............. *B60R 1/00* (2013.01); *B60R 1/04* (2013.01); *B60R 1/0612* (2013.01); *H04N 7/18* (2013.01); *B60R 1/06* (2013.01); *B60R 2300/303* (2013.01); *B60R 2300/306* (2013.01); *B60R 2300/70* (2013.01); *B60R 2300/802* (2013.01); *B60R 2300/8046* (2013.01); *B60Y 2400/92* (2013.01); *G08G 1/096716* (2013.01); *G08G 1/096725* (2013.01); *G08G 1/096775* (2013.01); *G08G 1/167* (2013.01)

(58) Field of Classification Search
None
See application file for complete search history.

(56) References Cited

U.S. PATENT DOCUMENTS 7,463,381 B2 12/2008 Shiohara
2003/0043479 A1* 3/2003 Su .......................... B60R 1/025
359/843

(Continued)

FOREIGN PATENT DOCUMENTS

DE 10 2010 032 411 2/2012
DE 10 2011 010 624 8/2012

(Continued)

*Primary Examiner* — Jennifer D. Carruth
(74) *Attorney, Agent, or Firm* — Cozen O'Connor

(57) ABSTRACT

A mirror replacement system for a vehicle. At least one image capturing unit adapted to be mounted around the exterior of the vehicle and capture images of at a field of view, an image display unit adapted to be visibly mounted for a driver, at least one driver sensor adapted for detecting information input from the driver, an operation controller adapted for controlling reformatting parameters based on driver parameters received from the at least one driver sensor, and an image capturing unit controller adapted for reformatting video data received from the at least one image capturing unit according to the reformatting parameters and for forwarding the reformatted video data to the at least one image display unit for displaying.

19 Claims, 2 Drawing Sheets

(56) References Cited

U.S. PATENT DOCUMENTS

| | | |
|---|---|---|
| 2012/0200664 A1 | 8/2012 | Lang et al. |
| 2013/0229519 A1 | 9/2013 | Kavuru |
| 2014/0121899 A1* | 5/2014 | Sung ................... B60R 1/00 701/36 |
| 2015/0103172 A1 | 4/2015 | Shimizu |
| 2015/0251599 A1* | 9/2015 | Koravadi ............ B60Q 9/008 340/903 |
| 2017/0310906 A1* | 10/2017 | Onaka .................. B60R 1/12 |

FOREIGN PATENT DOCUMENTS

| | | |
|---|---|---|
| DE | 10 2012 001 835 | 8/2013 |
| DE | 102013214369 | 1/2015 |
| DE | 10 2014 006 150 | 10/2015 |
| DE | 10 2014 006 153 | 10/2015 |
| EP | 2860691 | 4/2015 |

* cited by examiner

MIRROR REPLACEMENT SYSTEM FOR A VEHICLE

BACKGROUND OF THE INVENTION

1. Field of the Invention

The present invention relates to a mirror replacement system for a vehicle, in particular for a commercial vehicle.

2. Description of the Related Art

In motor vehicles, so-called fields of view are legally-prescribed based on the type of motor vehicle, for example, motorcycles, motor vehicles for transporting passengers, motor vehicles for transporting goods, etc. The fields of view must be provided by a device for indirect viewing and must be viewable at all times by the driver sitting in the driver's seat using the device for indirect viewing. Depending on the type of vehicle and, in particular, on which areas around the vehicle can be directly viewed by the driver, different legal provisions require that certain fields of view are permanently and reliably viewable at all times using the devices for indirect viewing. In Europe, the fields of view which have to be reliably visible for a driver all times are defined in the UN/ECE Regulation No. 46 which is further described below. Other relevant regulations include e.g. ISO 16505.

For commercial vehicles, such as, for example, trucks or delivery vehicles, a primary mirror is currently provided on each of the driver's side and the passenger's side as the device for indirect viewing. By using the primary mirror, the vehicle driver can see a level and horizontal part of the road surface of a certain width that extends from a stipulated distance behind the vehicle driver's eye points up to the horizon. In addition, a band of larger width must be viewable for the vehicle driver using this mirror, which band begins at a short distance behind the driver's eye points. Such legally-prescribed areas, which must be viewable permanently and at all times by the driver with the use of the devices for indirect viewing, will be designated as fields of view.

Currently, according to the field of view of Class II of UN/ECE Regulation No. 46, the field of view of the exterior rear-view mirror (primary mirror) on the driver's side and the exterior rear-view mirror on the passenger's side must be adapted such that the driver can see at least a 4 m wide, flat, horizontal portion of the road, which is bounded by a plane parallel to the median longitudinal vertical plane and passing through the outermost point of the vehicle on the driver's side and the passenger's side of the vehicle, respectively, and which extends from 20 m behind the driver's eye (ocular points) to the horizon. In addition, the road must be visible to the driver over a width of 1 m, which is bounded by a plane parallel to the median longitudinal vertical plane and passing through the outermost point of the vehicle starting from a point 4 m behind the vertical plane passing through the driver's eye (ocular points).

In addition to these primary (main) mirrors, fields of view (vision), which are reproduced (shown or depicted) by wide-angle mirrors, are required to be viewable on both sides of the commercial vehicle. An area behind the eye (ocular) points of the driver is viewed with the wide-angle mirrors in a certain length in the longitudinal direction of the vehicle; this area is wider than the area viewable by the primary mirror, but only extends a certain length along the vehicle. This area is defined as field of view IV (Class IV) according to the UN/ECE Regulation No. 46.

Currently, according to the field of view of Class IV of UN/ECE Regulation No. 46, the field of view of the "wide-angle" exterior mirror on the driver's side and the "wide-angle" exterior mirror on the passenger's side must be such that the driver can see at least a 15 m wide, flat, horizontal portion of the road, which is bounded by a plane parallel to the median longitudinal vertical plane and passing through the outermost point of the vehicle on the driver's side and the passenger's side of the vehicle, respectively, and which extends from at least 10 m to 25 m behind the driver's eye (ocular points). In addition, the road must be visible to the driver over a width of 4.5 m, which is bounded by a plane parallel to the median longitudinal vertical plane and passing through the outermost point of the vehicle starting from a point 1.5 m behind the vertical plane passing through the driver's eye (ocular points).

Conventionally and as described above, the view into the fields of view is provided with one or more mirrors. However, mirrors have some drawbacks. For example, mirrors only show the driver objects which are one the same side of the mirror as the drivers. Any object behind a mirror cannot be shown by that mirror. Additionally, mirrors made of flat glass only show the driver a small area unless the mirrors are very close to the driver. If they are convex shaped, this creates image distortion. For large vehicles, it is common to have seven or more mirrors mounted around the outside of the vehicle, most of which are distorted and convex, and it is even common for these vehicles to still have blind spots, despite of all the mirrors. Additionally, it is difficult for the driver to pay attention to all relevant mirrors at the same time.

In recent times, it is becoming increasingly common to consider using camera systems as devices for indirect viewing either in addition to or as a replacement for the mirrors as devices for indirect viewing. In such camera systems, an image sensor device continuously captures (detects and stores) an image. The (video-) data captured by the image capturing unit are transmitted, e.g., using a supply unit and optionally after further processing, to a display device located in the driver's cabin. The display device depicts a view into the corresponding legally-prescribed field of view or a plurality of fields of view and optionally supplemental information, such as e.g., possible collision risks, distances to other objects, etc., for the area around the vehicle in manner that is permanently viewable at all times for the driver, while offering a superior night vision, more flexible placement options and larger fields of view with the opportunity for less distortion.

Permanently viewable means in this context that the view into the field of view is depicted in a timely uninterrupted manner, i.e. not interrupted by alternatingly showing and hiding the field of view or parts thereof or by overlaying other representations such that the field of view cannot be seen completely. Accordingly, the respective field of view or the fields of view are continuously and in real time shown on the display device. This holds for all vehicle conditions, in which the ignition is switched on, preferably e.g. coupled to a sensor which receives a corresponding signal, e.g. a door opening signal or an ignition switch signal.

US 2013/0229519 A1 discloses an automatic rear view display which includes a single camera configuration and a dual camera configuration. In the single camera configuration, as soon as an entertainment screen in a ceiling mounted entertainment system is opened or when the driver puts the vehicle in reverse, the view from a first camera proximate to the rear license plate is displayed on the rearview mirror. In the dual camera version, when the entertainment screen is opened, the view from a second camera near the roof of the vehicle is displayed in the rearview mirror. In the dual camera version if the driver puts the vehicle in reverse, with the entertainment screen open or closed, the view from a first camera would be displayed instead. In both versions as soon as the entertainment screen is closed (and the vehicle is not in reverse) the rearview mirror goes back to being a regular mirror.

U.S. Pat. No. 7,463,381 discloses a method which includes selecting a video source view from at least one of a plurality of vehicle-mounted video sources based on detection of a vehicle event. The video source view may be displayed according to a presentation mode. The method may include associating a plurality of vehicle events with a video source view or video presentation mode. A system includes display logic selecting a video source view from a plurality of vehicle mounted video sources based on detection of a vehicle event. The system can include presentation rules specifying an association between a plurality of vehicle events and a video source view and/or a video presentation mode. The presentation rules are editable and configurable.

Modern mirrors create a nearly perfectly sharp picture for a driver. The level of detail available to the driver is dependent on the distance to the object and the eyesight of the driver. With camera systems, the level of detail available is affected by many different parameters: the resolution of the camera sensor, the field of view of the camera, but also the resolution of the monitor, how much of the camera field-of-view is being displayed on the monitor, how far away the monitor is from the driver space, and the eyesight of the driver. In some combinations of those parameters, drivers may be able to zoom in and see far off objects clearly that they would be unable to see in a mirror. In other combinations of those parameters, the driver may be looking at an area with such poor resolution that he fails to identify a dangerous traffic threat.

Further, with mirrors, the driver is able to use this natural depth perception to view the three dimensions in the mirror. This gives the driver a comfortable understanding of his own position relative to the environment of the object in it. The driver does not get depth perception while using camera systems with commonly available two-dimensional displays, which means that the driver must use the visible size of features on the screen to judge both relative position and relative speed. It can be especially difficult to make this judgment, if the driver is allowed to zoom into or out of the image. If the driver is allowed to zoom in and out, he can very easily lose track of how far away objects in the environment are, and this can create dangerous situations in the road.

Further, with mirrors, the driver is able to move his head by leaning and by turning to view different areas. This gives the driver access to a wider field of view, and it also gives the driver a comfortable understanding of where he is looking in the surrounding environment. Camera systems can allow the driver to pan around to see different areas, but the driver uses the physical sensations of leaning and looking, so he may lose track of where exactly he is looking in the environment. This can create a dangerous situation, if the driver misjudges the location of an object in view, or if the driver leaves the camera system showing an irrelevant area of the environment and not showing the important areas.

SUMMARY OF THE INVENTION

Accordingly, it is an object of the present invention to provide a mirror replacement system which allows the driver to interact with the mirror replacement system in order to view desired features, while the driver reliably views the view into the legally-prescribed fields of view at all times and in real time. Desired features are adapted settings of the fields of view, such as a special resolution or contrast of the field of view or a special focus (zoom) in the fields of view.

The above object is solved by a mirror replacement system for a vehicle with the features according to claim 1. Preferred embodiments are defined in the dependent claims.

The invention is based on the general idea to improve the representation of the data which are shown on an image display unit, such as a monitor, of a mirror replacement system for a vehicle according to the driver's preference such that the driver has a better awareness of the current situation around his vehicle, while he views the legally-prescribed fields of view permanently at all times in a continuous representation in real time. The modification parameters for the data to be displayed on the image display unit include one or more of the following: the aspect ratio, zoom, positions of different viewing frames, resolution, contrast, warping/de-warping or additional graphical overlays. In order to improve the image displayed to the driver, i.e. the image data, the system is designed such that the driver can influence or adapt the features shown on the image display unit on his own, however, only insofar as the views into the legally-prescribed fields of view are not compromised. The system is designed such that the driver can perform adapted settings before starting the engine, i.e., during parking, or during driving operation. The driver's inputs (requests, settings) are received from a driver sensor which supplies the requests as driver parameters to an operation controller (safety controller).

The combination of such pre-settings, driver's input and e.g. legal requirements define the operating range of the system, i.e. the operating range of the displayed views, corresponding to minimum requirements of what has to be shown on the display in which manner. If all displayed views are within this operating range, the system in its entirety is within the operating range. The operating range may be defined based on a variety of pre-set rules, and for verifying that these rules are met all time, the definition of the operating range might involve discrete rules and/or complex logic. The operating range is not necessarily identical for all possible occurring driving situations and might include sub-sections which define the operating range for specific driving situations.

The operation controller further defines a reformatting range of reformatting parameters which are input into an image capturing unit controller (camera controller, calculation unit, CPU). Alternatively, the image capturing unit controller might define the reformatting range of the reformatting parameters, i.e. those parameters with which the captured image is reformatted before display on the image display unit. The actual reformatting parameters are set by the system such that the system stays always within the operating range and based on additional data, like e.g. date received from vehicle sensors, from sensors receiving date from outside and/or date of user inputs, like actual zoom preferences. The image capturing unit controller also receives live image data from one or more image capturing units (cameras) and reformats these data to be suitable for display on one or more image display units according to the reformatting parameters. The view on the image display unit depends on the reformatting parameters, i.e., is the image data received from the image capturing unit reformatted by means of the reformatting parameters. If the system, especially the operation controller setting and determining the reformatting parameters, detects that reformatting the data for the image to be displayed on the image display unit would lead to the displayed view no longer being within the defined operating range of the system, i.e. the displayed image would no longer fulfill the requirements set by the system or the user, e.g. the fields of view which are legally prescribed to be visible at all times would no longer be shown, the reformatting parameters are automatically modified, overwritten, blocked or amended by the system such that it is ensured that the displayed view and the system remain within the operating range. This means the operation controller controls the reformatting parameters to be within a predetermined reformatting range of the reformatting parameters. This excludes that the image data displayed on the image display unit is not within the operating range at any time. The system helps the driver to see the most important views and information clearly and effectively at all times, while the driver's freedom to see what he wants to see when he wants to see it is maximized, while the operation of the system showing the legally-prescribed fields of view and satisfying all other system requirements needed for complying with the operating range is ensured.

Such a system requires a continuous monitoring of the fields of view and the driver's inputs, a permanent judging whether the fields of view or other (legal) requirements and the driver's inputs match and real time re-adjusting of the reformatting parameters for the data shown on the image display unit dependent on the fields of view and the driver's inputs. Image capturing units, such as camera systems, allow a driver flexibility beyond what is offered by mirror systems. Thus, it is necessary that such image capturing units are adapted to keep the driver fully aware of the current state of the mirror replacement system and are adapted to return it to a safe state as soon as possible any time safety may be compromised. That is, the system is adapted to override the driver inputs if the inputs result in that the image display unit no longer displays within the operating range, e.g. no longer displays the legally prescribed fields of view and/or does not display a safety critical situation, such as a upcoming collision situation, if arising, and/or does not satisfy other system requirements comprised in the system operating range.

The mirror replacement system according to the present invention can be used in vehicles, preferably commercial vehicles, but also passenger cars. The system can serve as a mirror replacement system, for example, for primary mirrors and wide-angle mirrors of a commercial vehicle with respect to the resolution of the data and the insight into the legally prescribed fields of view, and at the same time allows the driver to comfortably and easily navigate to different views of his environment without compromising drivers' spatial and situational awareness.

Additionally, the operation controller can be adapted to define a reformatting range of the reformatting parameters, such that reformatting the data with the reformatting parameters ensures the operating range of the system being met. Alternatively, the image capturing unit controller or any other suitable unit can define the reformatting range of the reformatting parameters.

The operation controller and the image capturing unit controller can be provided as a single controller which is adapted to define the reformatting range of the reformatting parameters. The operation controller and/or the image capturing unit controller can be included in an electronic control unit (ECU) of the vehicle and/or can be a micro controller based on semiconductor technology. In principle, the image capturing unit can be adapted to perform all the tasks of the operation controller, either additionally or alternatively to the operation controller. All components, including one or more of the displaying unit, image capturing unit controller, image capturing unit, operation controller, can be provided separately or combined. Further, as far as applicable, they can be integrated in a vehicle board computer and/or a driver assist system.

In a preferred embodiment, the field of view corresponds to the field of view of a main mirror and/or the field of a wide-angle mirror such as defined in the UN/ECE R46 for rear view mirrors. That is, the image capturing unit is adapted to capture an image corresponding to a primary mirror (field of view II) and/or an image corresponding to a wide-angle mirror (field of view IV). However, it is also conceivable, for example, that two image capturing units exist, one of which being adapted for capturing the image corresponding to a primary mirror (field of view II) and the other one being adapted for capturing an image corresponding to a wide angle mirror (field of view IV).

Preferably, the operation controller is adapted to define the operating range based on legal requirements for display of fields of view and vehicle dimensions. Legal requirements may include UN-regulations dispatched from the Economic Commission for Europe, such as UN/ECE R46 for rear view mirrors. However, it is also conceivable that the operation controller is adapted to define the operating range based on regulations, for example, ISO-Standards, such as ISO 16505, regulations as for a minimum and/or maximum contrast, brightness and resolution, but also based on customer vehicle regulations. Further, it is conceivable that the operation controller is adapted to define the operating range based on vehicle references, such as the presence or absence of a trailer. The more data are used for defining the operating range, the more exact the operating range and subsequently, the reformatting range for the reformatting parameters can be defined. The operating range might additionally be defined based on one or more user inputs, e.g. minimum requirements for zoom, resolution, contrast of the displayed views.

In a preferred embodiment of the invention, the mirror replacement system is further provided with at least one vehicle sensor adapted for detecting vehicle parameter information from the vehicle, the operation controller being adapted for controlling the reformatting parameters based on vehicle parameters received from the at least one vehicle sensor. Vehicle parameters preferably include one or more of a vehicle driving direction, a vehicle speed, a vehicle location, trailer presence or absence and/or driver controls. Driver controls may be turn signals, throttle or brake controls (the amount of acceleration or deceleration), headlights control, etc. Vehicle parameters may also include information about the driver which the driver such as current seat position, whether the driver's eyes are fully open or partially closed, whether the driver appear to be tired, driver height and/or weight, and any other parameter which may be detected automatically using sensors inside the vehicle, in particular sensors for active driver monitoring. At least one vehicle sensor additionally to the at least one driver sensor allows a more precise definition of the reformatting range for the reformatting parameters.

Additionally or alternatively, the operation controller is adapted to define the reformatting parameters based on one or more of user inputs, preferably zoom, resolution and/or contrast settings and/or additional graphical inputs and/or overlays inputs.

Alternatively or additionally, the operating range may be different under different driving situations and the operation controller is adapted to select the respective driving situation specific operating range for definition of the reformatting range. Suitable selection parameters are e.g. based on a driving situation captured by the vehicle sensor or weather conditions captured by the vehicle sensor, such as turning on of fog lights or wind shield wipers, and/or by additional sensors, such as temperature sensors. Driving situations may include forward or reverse driving, speed, gear, etc. On the other hand, such parameters might also be used for setting the reformatting parameters, i.e. without previous selection of the situation specific operating range.

Preferably, the mirror replacement system further comprises an image analyzing unit adapted for analyzing one or more images received from the at least one image capturing unit based on information input from the driver and/or on vehicle parameter information. In other words, the image analyzing unit is adapted to analyze whether there exist data in the video data captured from the at least one image capturing unit which have to be displayed on the image display unit or enhanced or emphasized within the image to be displayed due to corresponding driver inputs and requests, respectively, or vehicle parameter information.

Preferably, the operation controller is adapted to receive traffic data from outside storage media, such as a server, traffic look-up tables and/or traffic databases, including the operating controller being adapted to get information wirelessly using cellular of V2V or V2X. The operation controller and/or the image capturing unit controller is/are adapted for using the traffic data for generating display information. For example, the operation controller can be adapted for receiving one or more of local speed limits in the area, local traffic information, information about detours and/or upcoming highway exits. This allows a fine adjustment of the reformatting parameters, but also allows the system to actively adapt the driver controls to predetermined information. In other words, the operation controller can additionally act as an Advanced Driver Assistance System (ADAS), whereby the safety of the driver and the environment and the comfort of the driver can be enhanced. The use of such Advanced Driver Assistance Systems also contributes to a more economic driving.

Further, the operation controller and/or the image capturing unit controller is/are adapted to receive additional sensor data from one or more distance sensor units and the operation controller and/or the image capturing unit controller is/are adapted for using the additional sensor data for generating display information. Preferably the operation controller and/or the image capturing unit controller is/are adapted to receive additional sensor data including object recognition results from other image capturing units and/or control units. For example, such additional sensor data may include data received from systems based on RADAR (radio detection and ranging) or LIDAR (light detection and ranging).

In a preferred embodiment, the operation controller and/or the image capturing unit controller is/are adapted for defining the reformatting range for the reformatting parameters based on safety information, preferably collision predicting information, comprising information about obstacles, and the operation controller and/or the image capturing unit controller is/are adapted for using the additional sensor data for generating display information. For example, the operation controller is adapted to provide the driver with information about obstacles, such as a bicycle rider, on the image display unit in a highlighted manner and/or may be indicated with/as an alert. Such safety information may e.g. be obtained by image analysis of the captured image or from distance sensors provided on the vehicle.

Preferably, the operation controller and image capturing unit controller are implemented in the same hardware, but may have separate software. A common housing for the operation controller and the image capturing unit controller is easy to manufacture and thus, cost saving. However, it is also conceivable that the operation controller and the image capturing unit controller, especially if being provided as a single controller, have a common software and a common hardware.

Preferably, the driver sensor comprises one or more of at least a touch pad, eye tracking device, voice controller, lever, joystick and/or button. In particular, the driver sensor is adapted to automatically detect driver inputs (such as inputs received by continuous monitoring the eye movement of the driver using an eye tracking device) or to receive driver requests which are actively input by the driver himself (such as inputs received by specific action of the driver using, e.g., a touch pad, lever or joy stick). Automatic detection of driver request requires that the driver sensor continuously monitors and detects, respectively, the driver's behavior, e.g., by eye tracking. Receiving active driver inputs requires that the driver actively selects one or more of the above control units, e.g., a touch pad, to input information to the operation controller and, thus, influence the data shown on the image display unit.

Preferably, the operation controller is adapted for ensuring that the minimum feature resolution is met for a specific image capturing unit view. For example, the operating range includes a minimum size/resolution for each view to be seen clearly by the driver and the operation controller continuously calculates the size/resolution for each view. The driver may be allowed to show one, two, three or more image capturing units in one monitor, but if the driver attempts to zoom in with a particular image capturing unit such that the operating range would be violated, the operation controller will override the image capturing unit controller and prevent further zoom. If the driver attempts to shrink a particular image capturing unit view on the monitor to make more room for other image capturing units, the operation controller may override those action to maintain the size/resolution within the operating range. The operation controller may take into account the distance from the monitor to the driver's eyes, the resolution of the monitor, the lighting conditions in the cabin at the time, etc.

Alternatively or additionally, the operating range may include that features of a view which the driver desires to view (desired features) are visible on the at least one image display unit at all times. Desired features may include the side of a trailer for a large truck, the trailer rear edge, or the picture of a vehicle which has been detected as relevant, e.g. by using a radar sensor. If the driver attempts to pan or zoom the image capturing unit view in a way that obscures these desired features, the operation controller is adapted to override this action to maintain the features in view according to the system operating range. If the operation controller decides that a particular image capturing unit provides the best view of a desired feature which is required by the operating range, but the driver is not currently viewing data gathered by this image capturing unit, the operation controller is adapted to display data of this image capturing unit on the monitor without driver intervention. If the driver attempts to display data gathered by another image capturing unit or move the shown views to data of an image capturing unit in such a way as to obscure desired features, the operation controller is adapted to override the reformatting parameters chosen because of driver input to maintain the reformatting parameters within the reformatting range such that the system remains within operating range. If the driver attempts to turn on graphical overlays or bring up other information on to the monitor over top of or in place of a view with desired features, the operation controller is adapted to override this driver input according to the operating range.

Alternatively or additionally, the operation controller is adapted for enhancing desired features of a view by adapting the brightness and/or contrast settings, preferably for some particular regions of a view, for example if an adaptation of the brightness and/or contrast settings makes the desired features more easily recognizable, and if minimum recognizability is a requirement according to the operating range. If reformatting parameters based on driver input attempt to reduce the monitor brightness or contrast at night time for eye comfort, the operation controller is adapted to recognize one or more vehicles approaching from behind, or obstacles in the road ahead, and to override the brightness and contrast settings to the minimum level which is necessary for easy recognition of these obstacles, i.e. the minimum level within the operating range. Operation controller is also adapted to artificially enhance the contrast for only some regions of a view, if it deems necessary according to the defined operating range. For example, if the driver attempts to make a lane change when there is already a vehicle in the desired lane, the operation controller is adapted to increase the visible contrast of the other vehicle, while reducing the contrast of the surrounding environment momentarily to make it easier for the driver to recognize the other vehicle. The operation controller is also adapted to artificially enhance the contrast or increase the brightness of faster moving vehicles or other desired features as necessary to maintain the system within the operating range, regardless of the parameters input by the driver.

In a preferred embodiment of the invention, the system is adapted for displaying additional information on the image display unit like a monitor, preferably graphical overlays. In particular, the operation controller is adapted to assist the driver in maintaining spatial and situational awareness while panning or zooming an image capturing unit view by notifying the image capturing unit controller to draw corresponding graphical indicators on the image display unit, if doing so is necessary for the system to remain within the operating range. The operation controller is adapted to recognize that the driver is attempting to zoom in on objects which appear very small in the image capturing unit view, and the operation controller is adapted to notify the image capturing unit controller to draw a graphic overlay showing the driver the expected scale of objects at different distances if such an overlay is required at that level of zoom according to the operating range. Additionally, the operation controller is adapted to calculate such distances based on GPS, GLONASS, Galileo or other satellite navigation systems, speed, other sensors, wireless communication with the other vehicles (V2V), or other available information, and is adapted to notify the image capturing unit controller to display these values on the monitor as required by the operating range. Additionally, the operation controller is adapted to recognize that the driver is panning a particular image capturing unit view, and the operation controller is adapted to notify that image capturing unit controller to draw graphical indicators on the screen showing the actively viewed region with respect to the position of the driver's vehicle, or showing the actively viewed region with respect to the total field-of-view of the image capturing unit as required to satisfy the operating range.

The reformatting parameters preferably include one or more of the following: aspect ratio, zoom, position of viewing window of extracted pictures, resolution, contrast, warping/de-warping or the creation of or addition of graphical overlays or other enhancements. Other enhancements may include one or more additional pictures in a picture. The more information are included in the reformatting parameters, the better the desired and necessary features are shown on the monitor and, thus, the better is the spatial and situational awareness of the driver.

In a preferred embodiment of the invention, the image capturing unit is directly connected to the operation controller, in order to provide the operation controller with live image data of the environment around or inside the vehicle, e.g. by means of an additional passenger image capturing unit to view a passenger, e.g. in a school bus. Alternatively, the image capturing unit can also be directly connected with the image capturing unit controller which provides the operation controller with the live image data. In case of a single controller instead of the operation controller, the image capturing unit is directly connected with this single controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention will be described in an exemplary manner with the assistance of the appended Figures, in which.

DETAILED DESCRIPTION OF THE PRESENTLY PREFERRED EMBODIMENTS

Figure 1:
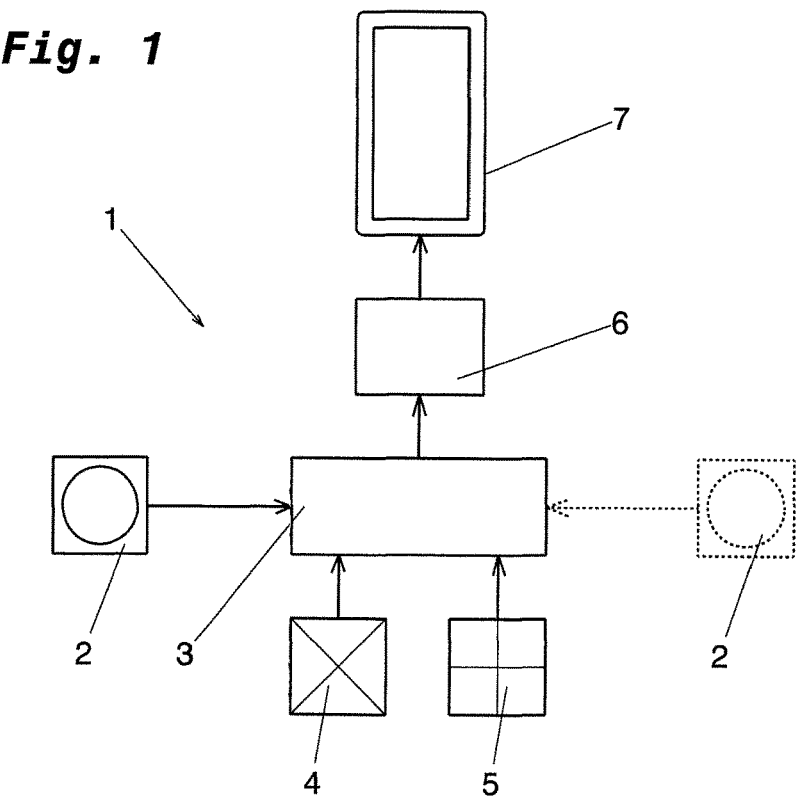
FIG. 1 schematically shows the mirror replacement system according the invention.

FIG. 1 shows a schematic view of a mirror replacement system 1 of a vehicle (not shown) according to the invention. The mirror replacement system 1 is mounted to the vehicle. The mirror replacement system 1 comprises an image capturing unit 2 on the outside of the vehicle, an operation controller 3, an image capturing unit controller 6 and an image display unit 7 arranged such that the driver can easily view the image display unit when sitting on the driver's seat. The operation controller 3 is connected with the image capturing unit 2 and the image capturing unit controller 6. The image capturing unit controller 6 is connected with the image display unit 7. However, it is also conceivable that the image capturing unit 2 is connected to the image capturing unit controller 6.

The image capturing unit 2, e.g. a camera or an image sensor, is adapted to capture an image corresponding to a primary mirror (field of view II) and an image corresponding to a wide-angle mirror (field of view IV). As indicated in FIG. 1 by dashed lines, there can also be provided two or more image capturing units 2. The one or two image capturing units 2 are cameras. A suitable camera as image capturing unit 2 is, for example, a digital video camera such as CCD or CMOS sensor cameras, preferably with a high definition (HD) resolution. However, any other camera which is adapted for monitoring the legally-prescribed fields of view can be used as image capturing unit 2.

In accordance with the existence of one or two cameras 2, the image capturing unit controller 6 is a camera controller.

The image display unit 7 is a monitor, preferably a LCD, TFT or LED monitor. The monitor may be visibly installed for a driver inside or outside the vehicle. In case of an installation of the monitor 7 inside the vehicle, the monitor may be equipped with a touchscreen which enables a driver to input information via one or multiple fingers, palms or gestures. Other image display devices, like e.g. projections to the A-pillar or any other structural part of the vehicle, are also possible.

The operation controller 3 is further connected to a driver sensor 4 for interacting with the driver and a vehicle sensor 4 for interacting with the vehicle. In particular, the driver sensor 4 detects and/or receives data input from the driver (driver parameters) and the vehicle sensor 4 detects and receives vehicle parameters.

The operation controller 3 is adapted to receive live image data from the one or more cameras 2. In case the one or more cameras 2 are connected with the camera controller 6, the operation controller 3 receives the live image data from camera controller 6.

Figure 2:
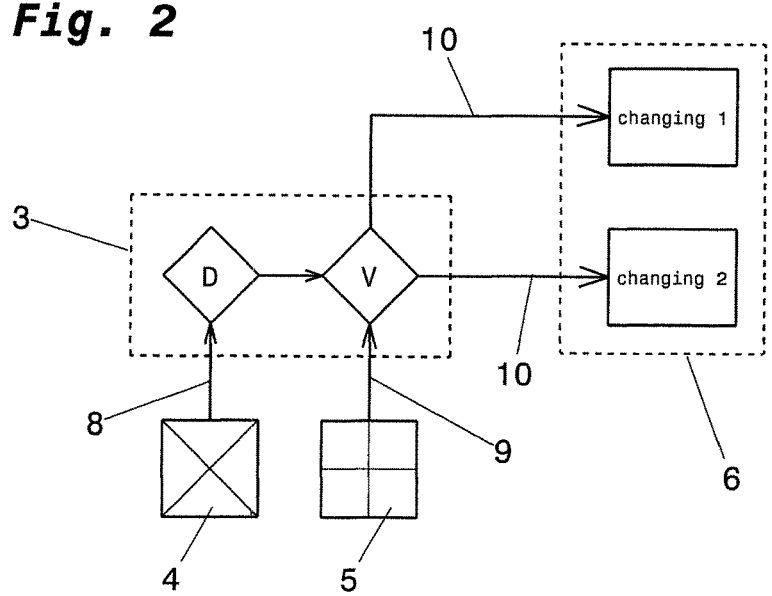
FIG. 2 is a detailed schematic view of the mirror replacement system of FIG. 1.

As shown in FIG. 2, the driver sensor 4 is adapted to submit driver parameters 8 which are dependent on the driver's inputs to the operation controller 3. For example, the driver may change the zoom, the position of viewing windows, the resolution of one or more displayed images by use of levers, joysticks or buttons, but also by eye tracking, voice control or preprogrammed preferences or touch pad input on either the monitor 7 or a separate touch pad for communicating the driver's preferences to the operation controller 3. These preferences include what the driver would like to see or not to see in a particular monitor, along with how he wants to see it.

The vehicle sensor 5 is adapted to submit vehicle parameters 9 which are dependent on the vehicle information or vehicle operation state to the operation controller 3. The vehicle information may include the vehicle direction, the vehicle speed, the vehicle location, trailer presence or absence, but also weather conditions such as wet or dry driving surface or the outside temperature. The vehicle operation state may include the state of driver controls such as switching on a turn signal or operating the brake or the gas pedal.

The operation controller 3 is adapted to define an operating range for the system and a corresponding reformatting range for the reformatting parameters 10 and is adapted to provide the camera controller 6 with reformatting parameters 10. The reformatting range is the range within which the reformatting parameters 10 have to stay at all times in order to ensure that the driver can view the legally-prescribed fields of view or any other information pre-determined as essential i.e. to ensure that the system remains in the operating range, i.e. the displayed views remain in the operating range.

The definition of the operating range may include regulations, vehicle references and the requirement to display always the picture of one or more image capturing units of the vehicle. Regulations may include ISO-Standards, such as ISO 16505, UN-regulations dispatched from the Economic Commission for Europe, such as UN/ECE R46 for rear view mirrors, but also costumer vehicle regulations. Vehicle references may include dimension of the vehicle or the presence or absence of a trailer.

Image capturing units may be for example the camera(s) 2 or one or more passenger cameras. Reformatting parameters 10 may include changing of the aspect ratio, the zoom, position of viewing windows, the resolution, the contrast, warping/de-warping and a communication protocol, physical communication media or it may include the creation of or addition of graphical overlays or other enhancements.

The camera controller 6 is adapted to reformat the live image data from the camera 2 to be suitable for displaying on the monitor 7 according to the reformatting parameters received from the operation unit 3 and is adapted to submit the reformatted data to the monitor 7. The monitor 7 displays the reformatted data received from the camera controller 6. The monitor 7 may be designed such that the data captured by the one or more cameras 2 are displayed simultaneously in different regions of the monitor, preferably at different pan or zoom configurations. They may be displayed with the split screen method. However, it is also conceivable that there are provided multiple monitors 7, each of which displays either a single camera view or multiple camera views.

Figure 3:
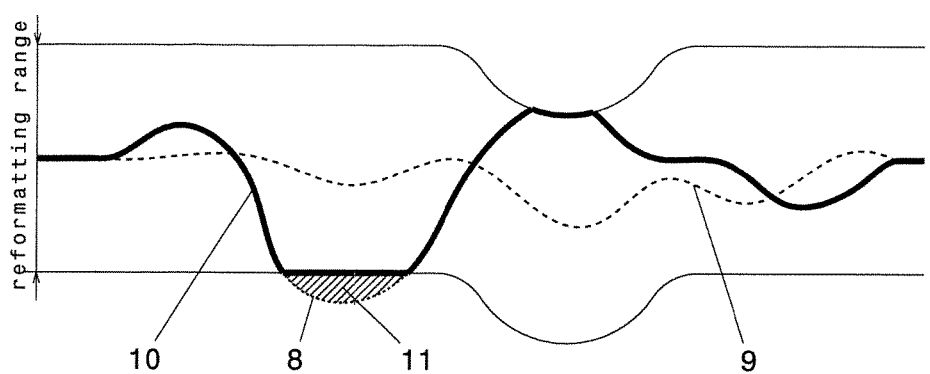
FIG. 3 diagrammatically shows the change of the reformatting parameters dependent on the driver parameters and the vehicle parameters.

In FIG. 3, the change of the reformatting parameters dependent on the driver parameters 8 and vehicle parameters 9 over the time (x-axis of the diagram of FIG. 3) is shown. The reformatting range of the reformatting parameters 10 extends in the vertical direction (up and down direction in FIG. 3) and has an upper limit and a lower limit (shown by solid lines). The reformatting parameters must always stay within the borders of the operating range/reformatting range, i.e. between the upper and lower limit in FIG. 3. The upper limit is shown as n essentially horizontal line extending at an upper end of the operating range. The lower limit is shown as an essentially horizontal line extending at a lower end of the operating range. Between the upper and lower limits of the operating range, the vehicle parameters 9 and the reformatting parameters 10 are shown as undulated lines which mainly run from left to right, i.e. in the horizontal direction. The left-right direction (x-axis) corresponds to the time. The reformatting parameters 10 are indicated as solid, bold line. The vehicle parameters 9 are indicated as a dashed line. The reformatting parameters calculated based on the driver parameters 8 coincide with the actual reformatting parameter 10 except in an area 11 below the lower limit of the operating range, where they are shown as dashed line.

In the exemplary distribution of the vehicle and reformatting parameters 9, 10 as shown in FIG. 3, the modification of the image to be displayed based on the vehicle parameters 9 keeps the image within the operating range at all times. The driver parameters 8 result in reformatting parameters 10 which are within the allowed range of the reformatting parameters 10 for all depicted times, except the time in which the driver parameters 8 would lead to reformatting parameters 10 outside of the reformatting range, i.e. below the lower boarders of the operating range, in FIG. 3. In those circumstances in which the driver parameters 8 are within the operating range, they are used as reformatting parameters 10 without further modification. This means, the driver's wishes regarding the representation on the image display unit 7 are fully considered without amendment. In case the driver parameters 8 fall below the lower limit and, thus, leave the operating range (area depicted hashed in FIG. 3)

the reformatting operation based on the driver's parameters would result in the displayed image not being satisfactory, i.e. not fulfilling legal requirements, for example. I.e. the leaving of the operating range results from one or more driver's inputs by which the driver attempts to influence and adapt, respectively, the displayed image shown on the monitor 7 such that the operating range is left. In this case, the operation controller 3 calculates in real time based on the driver's input whether the conditions for staying in the operating range are met and, if this is not the case, overrides the driver parameters 8 before using them as reformatting parameters 10, as it is shown in FIG. 3, by the part of the solid line of the reformatting parameters 10 coinciding with the lower boundary of the operating/reformatting range, such that the reformatting parameters 10 always remain within the reformatting/operating range.

For example, the driver may be allowed to show two or more cameras 2 in one monitor 7, and the operation controller 3 calculates in real time what size each view must be shown on the monitor 7 to be seen clearly by the driver. If the driver attempts to zoom in further with a particular camera 2, the operation controller 3 will override the camera controller and prevent further zoom. If the driver attempts to shrink a particular camera view on the monitor 7 to make more room for other cameras 2, the operation controller 3 may override those action to maintain the resolution within the desired operating range. The operation controller 3 may take into account the distance from the monitor 7 to the driver, the resolution of the monitor 7, the lighting conditions in the cabin at the time, etc. Leaving the operating range means that the driver can no longer view the necessary operating range in order to have full spatial and situational awareness of the environment around the vehicle. The area lying outside the operating range is depicted in FIG. 3 as hatched surface and provided with the reference numeral 11.

As shown in FIG. 3, in case of driver parameters 8 which result in that the operating range is left, the operation controller 3 overrides these driver parameters 8 in order to assist the driver to maintain spatial and situational awareness while performing the inappropriate changes of the display of the monitor 7. That is, the operation controller 3 acts as a correction unit for the driver parameters 8 and corrects the driver parameters 8 such that the operating range is maintained. In particular, the operation controller 3 overrides the driver parameters 8 such that the reformatting parameters 10 do not fall below at its lower limit, but run along the lower limit of the operating range. Thus, the operation controller 3 uses the changing vehicle parameters 9 and the changing driver parameters 8 to calculate whether the mirror replacement system 1 is within the correct operating range and controls the reformatting parameters 10 to maintain the operation within the operating range. The system helps the driver to see the most important views and information clearly and effectively at all times, while the driver's freedom to see what he wants to see when he wants to see it is maximized, while the operation of the system 1 in the legally-prescribed fields of view is ensured.

As can be seen in FIG. 3, the reformatting range is not necessarily identical at all times. The horizontal boundaries of the reformatting range in FIG. 3 are not straight but might, as it is shown in FIG. 3, have deviations from being straight. The deviations are caused, e.g., by vehicle parameters requiring an adaption of the reformatting range. This means that the driver parameters 8 must stay within this "shifted zone" for the operating range being met all times.

Combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A Mirror replacement system for a vehicle, comprising at least one image capturing unit adapted to be mounted around the exterior of the vehicle and adapted to capture images of at least one field of view around the vehicle, at least one image display unit adapted to be visibly mounted for a driver, at least one driver sensor adapted for detecting information input from the driver, an operation controller adapted for controlling reformatting parameters based on driver parameters received from the at least one driver sensor, and an image capturing unit controller adapted for reformatting video data received from the at least one image capturing unit according to the reformatting parameters and for forwarding the reformatted video data to the at least one image display unit for displaying, wherein the operation controller is adapted for using the driver parameters to calculate in real time if the mirror replacement system is within a predetermined operating range when the video data is reformatted using the reformatting parameters and for controlling the reformatting parameters to maintain an operation of the system within the operating range.

2. The mirror replacement system according to claim 1, wherein the system is adapted to set a reformatting range of the reformatting parameters to maintain an operation of the system within the operating range.

3. The mirror replacement system according to claim 2, wherein the image capturing unit controller and/or the operation controller is/are further adapted to define the reformatting range of the reformatting parameters.

4. The mirror replacement system according to claim 2, wherein the reformatting range is defined based on one or more of user inputs, preferably zoom, resolution and/or contrast settings and/or additional graphical inputs and/or overlays inputs.

5. The mirror replacement system according to claim 2, wherein the operation controller and/or the image capturing unit controller is adapted for defining the reformatting range for the reformatting parameters based on safety information.

6. The mirror replacement system according to claim 2, wherein the reformatting range of the reformatting parameters set by the operation controller and/or the image capturing unit controller includes ensuring a minimum feature resolution for the displayed image.

7. The mirror replacement system according to claim 1, wherein the field of view corresponds to the field of view of a main exterior mirror and/or the field of view of a wide-angle exterior mirror.

8. The mirror replacement system according to claim 1, wherein the operating range is defined based on one or more of legal requirements for display of fields of view and vehicle dimensions.

9. The mirror replacement system according to claim 1, further comprising at least one vehicle sensor adapted for detecting vehicle parameter information from the vehicle, the operation controller being adapted for controlling the reformatting parameters based on vehicle parameters received from the at least one vehicle sensor.

10. The mirror replacement system according to claim 8, wherein the vehicle parameters include one or more of a vehicle driving direction, a vehicle speed, a vehicle location, trailer presence or absence and/or driver controls.

11. The mirror replacement system according to claim 9, wherein the operation controller and/or the image capturing unit controller is/are adapted to define the operating range based on a driving situation and/or weather conditions.

12. The mirror replacement system according to claim 1, further comprising an image analyzing unit adapted for analyzing one or more images received from the at least one image capturing unit based on information input from the driver and/or on vehicle parameter information.

13. The mirror replacement system according to claim 1, wherein the operation controller and/or the image capturing unit controller is adapted to receive traffic data from outside servers and/or the operation controller and/or the image capturing unit controller (6) is/are adapted for using the traffic data for generating display information.

14. The mirror replacement system according to claim 1, wherein the operation controller and/or the image capturing unit controller is adapted to receive additional sensor data from one or more distance sensor units and the operation controller and/or the image capturing unit controller is/are adapted for using the additional sensor data for generating display information. preferably collision predicting information comprising information about obstacles, and the image capturing unit controller and/or the operation controller is/are adapted for using the safety information for generating display information.

15. The mirror replacement system according to claim 1, wherein the operation controller and image capturing unit controller are implemented in the same hardware.

16. The mirror replacement system according to claim 1, wherein the driver sensor comprises one or more of at least one touch pad, eye tracking device, voice controller, lever, joystick and button.

17. The mirror replacement system according to claim 1, wherein the image capturing unit controller and/or the image capturing unit controller is/are adapted for generating additional information on the monitor, preferably graphical overlays.

18. The mirror replacement system according to claim 1, wherein the reformatting parameters include one or more of the following: aspect ratio, zoom, position of viewing window of extracted pictures, resolution, contrast, warping/dewarping and communication protocol, physical communication media and/or the creation of additional graphical overlays.

19. The mirror replacement system according to claim 1, wherein the image capturing unit is directly connected to operation controller.

* * * * *

UNITED STATES PATENT AND TRADEMARK OFFICE
CERTIFICATE OF CORRECTION

PATENT NO. : 10,315,571 B2
APPLICATION NO. : 15/621113
DATED : June 11, 2019
INVENTOR(S) : Frederick Moulton et al.

Page 1 of 1

It is certified that error appears in the above-identified patent and that said Letters Patent is hereby corrected as shown below:

In the Claims

Column 15, Lines 6-9 should read:
5. The mirror replacement system according to claim 2, wherein the operation controller and/or the image capturing unit controller is adapted for defining the reformatting range for the reformatting parameters based on safety information preferably collision predicting information comprising information about obstacles, and the image capturing unit controller and/or the operation controller is/are adapted for using the safety information for generating display information.

Column 16, Lines 7-17 should read:
14. The mirror replacement system according to claim 1, wherein the operation controller and/or the image capturing unit controller is adapted to receive additional sensor data from one or more distance sensor units and the operation controller and/or the image capturing unit controller is/are adapted for using the additional sensor data for generating display information.

Signed and Sealed this
Eighth Day of October, 2019

Andrei Iancu
*Director of the United States Patent and Trademark Office*